United States Patent [19]

Hawley

[11] Patent Number: 5,203,103
[45] Date of Patent: Apr. 20, 1993

[54] ACTION FISHING LURE

[76] Inventor: James M. Hawley, 4272 Queen Ave. S., Minneapolis, Minn. 55410

[21] Appl. No.: 939,307

[22] Filed: Sep. 2, 1992

[51] Int. Cl.⁵ ............................................. A01R 79/02
[52] U.S. Cl. .................................... 43/17.1; 43/42.24
[58] Field of Search ................... 43/17.1, 42.24, 42.1, 43/42.28, 42.3

[56] References Cited

U.S. PATENT DOCUMENTS

| | | | |
|---|---|---|---|
| 4,211,027 | 7/1980 | Viscardi | 43/42.1 |
| 4,625,446 | 12/1986 | Morimoto | 43/17.1 |
| 4,653,212 | 3/1987 | Pirton | 43/42.1 |
| 5,105,573 | 4/1992 | Mays | 43/17.1 |
| 5,159,773 | 11/1992 | Gentry et al. | 43/17.1 |

Primary Examiner—Richard K. Seidel
Assistant Examiner—James Miner

[57] ABSTRACT

The invention relates a fishing lure that has a flexible body or a flexible joint or joints that are moved by the actuation of a Nitinol or shape metal alloy bending actuator means. This actuator can take the form of a Nitinol wire that is placed inside the lure in such a way that when the wire is heated by passing an electric current through it, it will move causing the lure to appear to be alive. In the form of a worm a rubber fishing lure would have a thin Nitinol wire with a second non contracting wire inside the body of the worm. When the Nitinol is heated by a pulse of electricity from the electric circuit the worm bends simulating a life like motion. Because of the electric circuit the frequency and amount of movement can be controlled as well as the life of the battery.

7 Claims, 2 Drawing Sheets

ACTION FISHING LURE

BACKGROUND

The invention relates a fishing lure that has a flexible body or a flexible joint or joints that are moved by the actuation of a Nitinol or shape metal alloy bending device. This actuator can take the form of a wire that is placed inside the lure in such a way that when the wire is heated by passing an electric current through it will move causing the lure to appear to be alive. In the form of a worm a rubber fishing lure would have a thin Nitinol wire with a second non contracting wire inside the body of the worm. When the Nitinol is heated by a pulse of electricity from the battery and electronic circuit it contracts and pulls against the second wire there by compressing it and because of its flexible nature causes the worm body to bend as well. This sudden bending motion simulates the life like motion of a live worm. Because of the electronic circuit the frequency and length of the pulse can be controlled thus allowing for the amount and duration of the worms movement.

Fisherman who use worms or live bait have the problem that when the bait dies on the hook it is not of much value in attracting fish. There is a wide diversity of fishing lures that move due to their mechanical shape as it is pulled through the water the problem with all such lures is that they must be pulled past and consequently away from the fish in order to achieve motion. Thus to achieve lifelike motion in one location the lure itself must move.

Objects and Advantages

Accordingly I claim the following as my objects and advantages of the invention: to provide a fishing lure that is capable of self movement thus improving on crank lures and live bait.

In addition I claim the following as objects and advantages of the invention: to provide a fishing lure that is capable of many hours of action limited only by battery life, to provide a fishing lure with a natural and lifelike motion, to provide a circuit board and electronics that send an electric pulse whose duration and frequency may be controlled thus allowing for varying types of motion and battery life conditions.

DRAWING FIGURES

DRAWING REFERENCE NUMERALS

FIGS. 1, 2

- 10: plastic worm
- 15: bending device
- 20: circuit board
- 25: battery
- 30: electric wire
- 35: wire connector
- 40: fish hook
- 45: battery connector
- 50: fish hook leader
- 55: fish hook leader connector

FIG. 3

- 4: PNP transistor
- 6: 10 Uf capacitor
- 7: 5 k ohm resistor
- 8: 555 timer IC
- 9: 150 k ohm resistor

FIG. 4

- 30: electric wire
- 32: electric wire
- 60: Nitinol wire
- 65: silicone rubber tube
- 70: stainless steel wire
- 75: wire crimp
- 80: wire crimp
- 85: wire crimp

Detailed Description of the Preferred Embodiments

Figure 1:
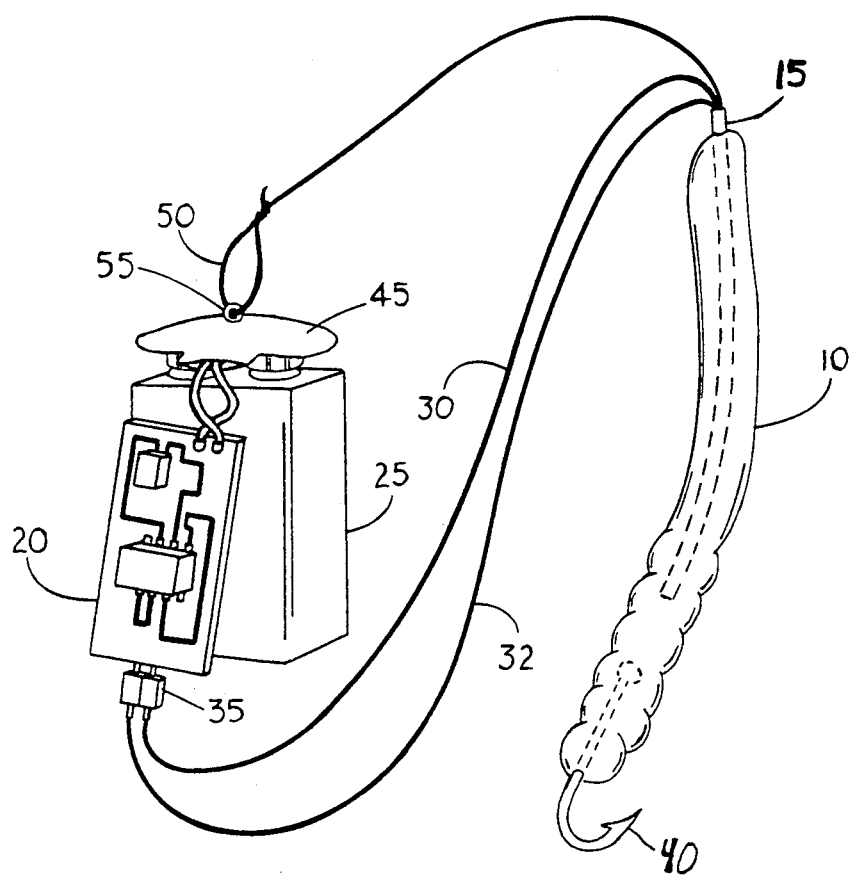
FIG. 1 shows a perspective of the lure according to the invention.

FIG. 1 shows an electronic fishing worm according to the preferred embodiment of the invention. The lure consists of a plastic worm body 10 with an imbedded Nitinol bending actuator 15 which is attached to the circuit board 20 by electric connecting wires 30 and 32 to the circuit board with the connector 35. The circuit board 20 is electrically connected to the battery 25 with the battery connector 45. The fishing hook 40 is mechanically connected to the battery by the fishing leader 50 which is attached to the leader connector 55 thus mechanically connecting the worm to the battery and the circuit board.

Figure 2:
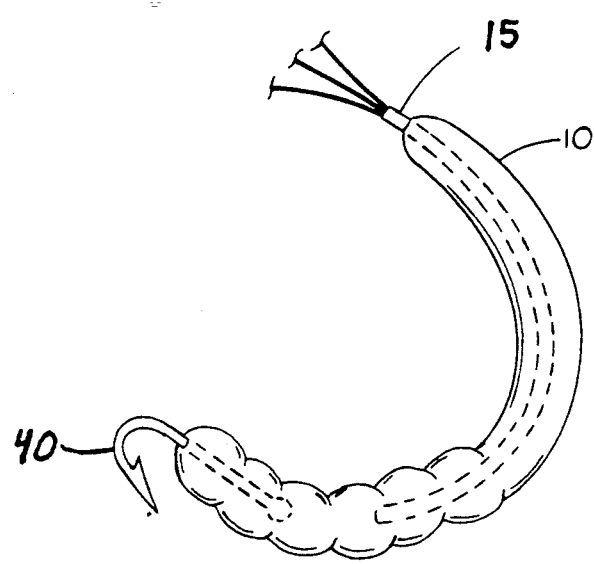
FIG. 2 shows a view of a worm type lure with bending actuator bent.

FIG. 2 shows the worm lure in a bent configuration where the Nitinol bending actuator 15 has been heated by an electric pulse from circuit board 20 and conducted through electric wires 30 to the bending actuator 15 the bending actuator 15 bends. It also bends the flexible rubber worm body 10 that surrounds the bending actuator 15.

The electronic fishing worm shown in FIG. 1 achieves lifelike worm motion by the Nitinol bending actuator 15 that is imbedded inside the plastic worm body. When the Nitinol is heated by an electric pulse from circuit board 20 it contracts within the body of the worm 10 thus causing a very lifelike bending motion. This motion will attract fish just as a real worm would.

Figure 3:
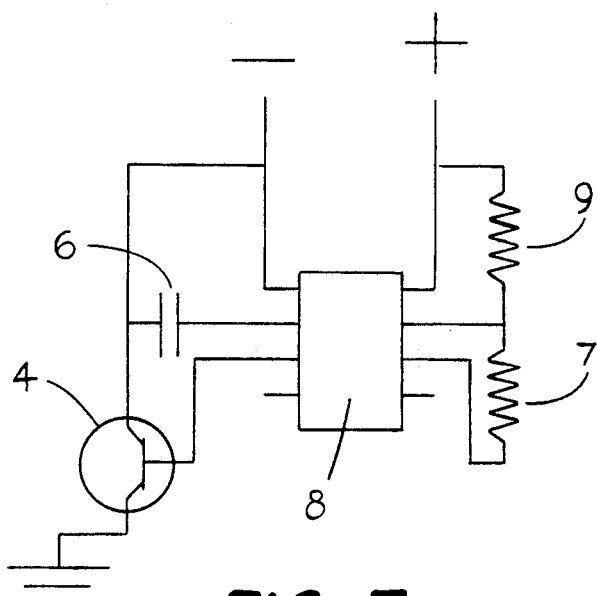
FIG. 3 shows a schematic diagram of the electronic circuit.

FIG. 3 is a schematic diagram that shows the preferred embodiment circuit board 20 consists of a 555 timer I.C. 8 with resistors 7, 9 and a capacitor 6 and a pnp transistor 4. The circuit allows for the control of the pulse duration and frequency given to the bending actuator.

Figure 4:
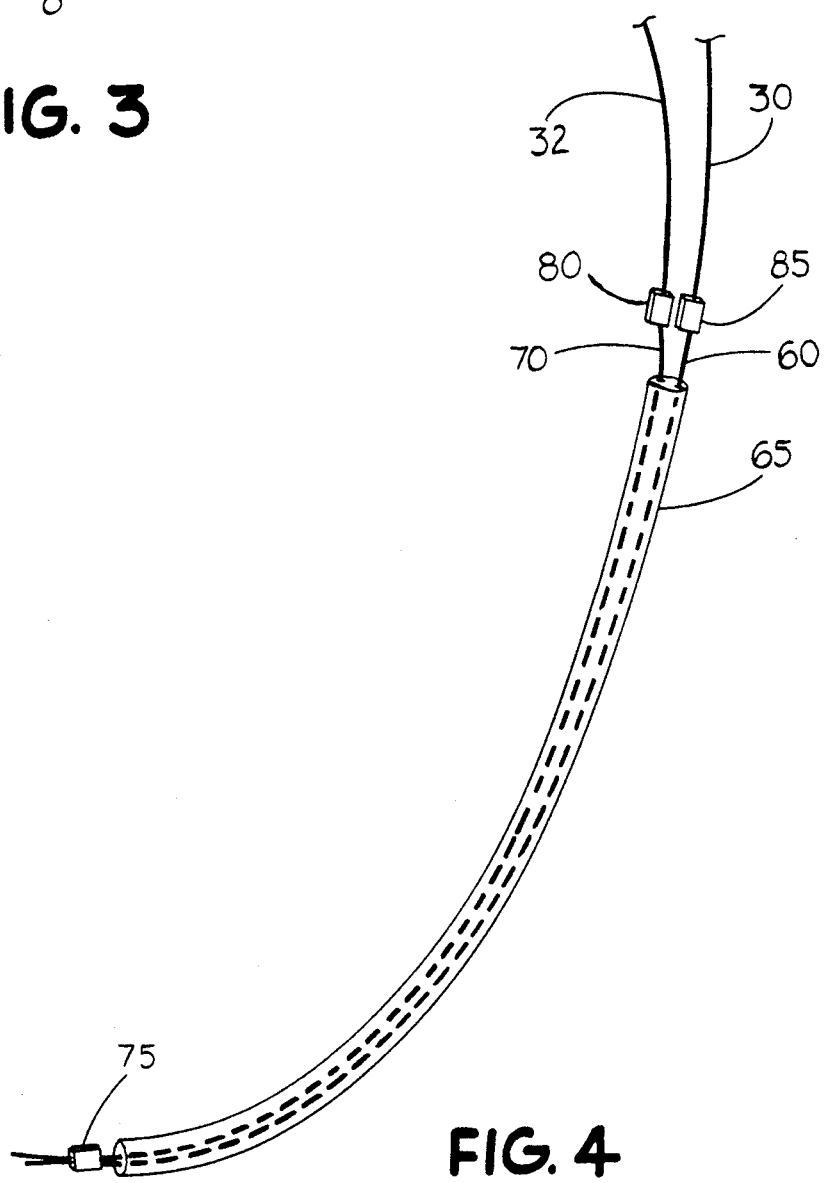
FIG. 4 shows a perspective view of the Nitinol bending device.

FIG. 4 shows a perspective view of the Nitinol bending actuator which is made of a silicone rubber tube 65 that contains a Nitinol wire 60 connected at one end with wire crimp 85 to the electric conducting wire 30 and at the other end to the stainless steel wire 70 with wire crimp 75. The other end of the stainless steel wire 70 is connected to the second electric conducting wire 32 with wire crimp 80. The two electric conducting wires 30 and 32 carry the electric pulse from the circuit board shown in FIG. 1 to the Nitinol bending device. By controlling the size and shape of the pulse delivered to the Nitinol the amount and frequency of motion may be controlled. This control allows for a very realistic motion of the device. In this case of a worm has been shown with the curling of its soft plastic body simulating life but it should be understood that any shape real or artificial bold be used. In the case of a minnow it would be the body or tail that moves and in a frog the legs would have the Nitinol bending actuator in them to simulate kicking. Also by controlling the size of the pulse the life of the battery may be extended. For while a pulse rate of three times a second could be very life like a pulse rate of once a second would triple the battery life.

What is claimed is:

1. A fishing lure comprising:
   a temperature sensitive actuator, the actuator including:
      a first end,
      a second end, and
      an electrically resistive actuator body extending there between the body of the actuator characterized by a first configuration at a first temperature and a second configuration at a second temperature greater than the first temperature;
   a pulsed electrical source electrically connected to the first and second ends of the actuator and providing a periodical electrical current through the actuator body, the periodical electrical current causes a temperature fluctuation of the actuator body between the first temperature and the second temperature, said temperature fluctuation causes said actuator body to move between the first configuration and the second configuration;
   a pliant fish attractive body mechanically connected to the actuator and changing shape in response to the configuration changes of the actuator.

2. The fishing lure of claim 1 wherein said actuator comprises a shape memory alloy.

3. The fishing lure of claim 2 wherein said shape memory alloy is Nitinol.

4. The fishing lure of claim 1 wherein said pulsed electrical source means is adjustable thereby giving variable amounts of current for differing amounts of time.

5. The fishing lure of claim 1 wherein said fish attractive body is mechanically attached to the pulsed electrical source thereby providing a mechanical fishing line connection from the body to the electrical source.

6. The fishing lure of claim 1 wherein said electrical source is enclosed to be made water proof.

7. the fishing lure of claim 1 wherein said fish attractive body comprises the fish attracting shape of a worm.

* * * * *